Feb. 28, 1950     N. A. DE BRUYNE     2,499,134
METHOD OF PROVIDING ADHESION BETWEEN SURFACES
Filed Nov. 29, 1944
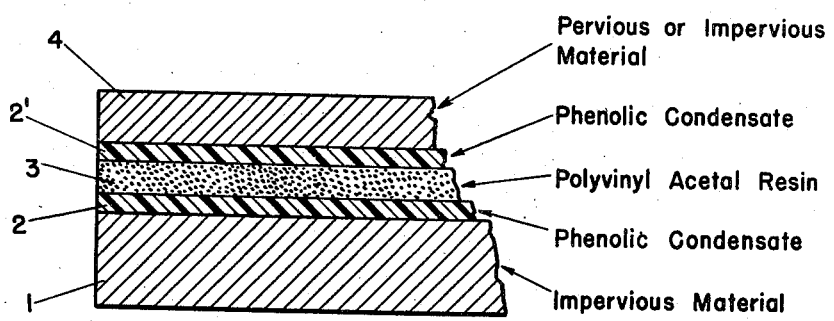
INVENTOR.
Norman Adrian de Bruyne
BY
ATTORNEY Patented Feb. 28, 1950

2,499,134

UNITED STATES PATENT OFFICE 2,499,134

METHOD OF PROVIDING ADHESION BETWEEN SURFACES

Norman Adrian de Bruyne, Duxford, England, assignor, by mesne assignments, to Rohm & Haas Company, Philadelphia, Pa., a corporation of Delaware Application November 29, 1944, Serial No. 565,793
In Great Britain May 4, 1942

12 Claims. (Cl. 154—122)

This invention relates to a method of bonding rigid impervious materials. It relates to a process of joining impervious materials, such as metal, together or to pervious materials such as wood. In particular, it relates to the joining of metals by means of an adhesive combination which is durable, waterproof, weatherproof, and heatproof and which produces bonds which are so strong that the tensile shear strength is measured in thousands of pounds per square inch of joined surface. Furthermore, it deals with a process for securely uniting materials of different coefficients of expansion in such a way that the joints are not broken by the stresses set up by the differences in the degrees of expansion of such materials.

Heretofore, it has been customary to join impervious materials, such as metals, together and to other materials, such as wood, by means of screws, bolts, rivets, or the like. Attempts have also been made to join such materials by means of adhesives or glues because such a process would be less time-consuming, could be conducted with less effort, and would require little equipment. For such purposes, two types of adhesives were used, viz, thermoplastic and thermosetting materials. In general, the thermoplastic types, characterized by tackiness or stickiness, failed for several reasons, including lack of water-resistance, poor durability, softening tendency, and cold flow. Even when applied under the most favorable conditions, the thermoplastic adhesives were found to be relatively weak and joints formed therewith ruptured under relatively low stresses. Such adhesives, of course, softened and became weaker at temperatures of higher than normal degree. Thermosetting adhesives were per se more durable and were not softened by rises in temperature but failed because either the adhesion was very low, as in the case of urea adhesives, or the layer of glue was too brittle to resist sudden shock or the stresses caused by differential expansion in the joined materials.

This invention is free of the defects noted above and insures such a strong joint between surfaces that it has already replaced rivets in many operations. For example, it is used in the construction of aircraft and has eliminated the need of many of the thousands of rivets which were formerly required and which were all hand-driven. Not only has this process resulted in a great saving of labor but it has also produced joints which are not only strong but which are far superior aerodynamically. This advantage is due to the smoothness of the joined surfaces and the elimination of protruding rivet heads which cause a "drag" on the plane when in flight.

The present process comprises the steps of (a) preferably cleaning the surfaces to be joined, (b) applying to said surfaces a solution of a heat-reactive phenolic adhesive, (c) applying thereto, in comminuted form, a vinyl acetal resin, (d) pressing the coated surfaces together and simultaneously applying heat to convert said phenolic adhesive to the insoluble, infusible form.

This process is a modification of the process described in my co-pending application Serial No. 497,848, filed August 7, 1943, of which this application is a continuation-in-part.

Joints made in accordance herewith are very strong and durable. Tensile shear values as high as 4500 pounds per square inch are obtained on lapped one-inch-square joints between strips of aluminum. Also, the joints remain strong when they are heated to temperatures as high as that of boiling water and are not ruptured by the stresses resulting from uneven expansion and contraction of the joined materials.

The phenolic adhesives which are operable are those prepared by the condensation of a phenol and an aldehyde. Phenols such as hydroxybenzene, cresol, and resorcinol may be used; and preference is given to hydroxybenzene. Mixtures of phenols, for example hydroxybenzene and cresol, may be employed. Although formaldehyde is much the preferred aldehyde, it may be replaced at least in part by other aldehydes such as acetaldehyde, benzaldehyde, furfuraldehyde, and the like. When formaldehyde is employed, it may be used in the form of an aqueous solution, in its polymeric forms, or as a compound such as formal or hexamethylene tetramine which yield formaldehyde under the conditions of the reaction. The ratio of formaldehyde to phenol may vary widely. Resins with a formaldehyde-to-phenol molar ratio of 1.2 to 2.0 have been used successfully. Ordinarily, the condensation is catalyzed by an acidic or an alkaline agent. Alkaline materials, such as sodium hydroxide, potassium hydroxide, sodium carbonate, zinc oxide, and the like, are used to advantage; and the hydroxides of sodium and potassium, particularly the latter, are preferred. Ammonium hydroxide may also be used.

The phenolic resin may vary widely in its degree of condensation, but it is, of course, essential that it be still heat-reactive. It is desirable that the condensate be soluble in water or in a mixture of water and alcohol, since it is used in the form of a solution in the bonding operation.

The polyvinyl acetal which is preferred is polyvinyl formal. Other polyvinyl acetals, such as the butyral and acetal, have been used successfully. However, the results as measured by the tensile strength of the joints are not as attractive as those obtained when the formal is used.

In my previous application, I indicated that the polyvinyl acetal might be used in the form of a sheet and that its use in that form, especially in conjunction with a phenolic adhesive in the form of a resin-impregnated sheet of paper, provided a very convenient method of applying an adhesive between the surfaces to be joined. While that process does have definite advantages in ease of assembling and preparing a joint, especially of flat, smooth surfaces, it has been found that somewhat stronger bonds may be prepared by employing a liquid phenolic resin and a polyvinyl acetal in the form of powder, small flakes, or granules. A liquid phenolic resin and a powdered polyvinyl acetal resin are especially recommended for the joining of surfaces that are irregular.

In order to obtain maximum strength in the joint, it is essential that the surfaces to be joined be free of any material which might prevent complete wetting of the surfaces by the phenolic adhesive. This can be accomplished by well-known methods such as scouring, sanding, sandblasting, washing with solvents or detergent solutions, and pickling.

The solution may be applied directly to the cleaned surfaces, for instance, by brushing, spraying, dipping, roller-coating, or similar suitable mode of application. While it is essential that the surface be thoroughly coated, it is not essential that a thick layer of phenolic resin be applied. A coating up to a few mils in thickness is adequate, especially in view of the fact that during the heating and pressing operation any excessive amount will be squeezed out of the joint.

The polyvinyl acetal resin in the form of small flakes or granules, or preferably as a powder, is applied to the surface of the phenolic resin while the latter is still in a tacky condition. This may be done by conventional methods such as spraying, dusting, sifting, and the like. Again, it is essential that the surface of the phenolic glue be completely covered with the polyvinyl acetal resin. Any excess not adhering to the phenolic resin may be removed by obvious methods. The ratio of polyvinyl acetal to phenolic resin solids has been varied from 4:1 to 1:4, and in all cases good bonds were obtained between strips of aluminum. While the ratio may be varied widely, it is sufficient to apply a thin coat of phenolic adhesive, cover this while tacky with powdered polyvinyl acetal resin, and remove the excess of polyvinyl acetal which does not stick to the phenolic resin.

The surfaces thus prepared are pressed together and the assembly so formed is simultaneously pressed and heated until the phenolic resin is thermally converted to the infusible stage and union is complete. The amount of pressure required will vary with the nature of the materials to be joined and, in some cases, may be measured in hundreds of pounds per square inch while in others a few pounds of positive pressure is sufficient. It is apparent that sufficient pressure is required to insure intimate contact of the coated surfaces.

The temperature of heating may vary over a fairly wide range above 200° F. but is preferably chosen between the temperatures of 240° F. to 350° F. These are the temperatures at which phenolic adhesives may be converted to the insoluble, infusible form in a matter of minutes. The resinous adhesive is converted to the infusible stage faster as the temperature is raised. The preferred single temperature is approximately 300° F. because, at this temperature, the reaction is rapid but not excessively so and it is particularly convenient when wood, which may be damaged above 300° F., is used as one of the materials to be joined. At temperatures above 300° F., it is desirable, though not necessary, to cool the bonded material to below 250° F. before the pressure is released, particularly if the joined materials are under a stress which tends to cause a rupture of the bond.

In many operations, it is necessary to apply polyvinyl acetal resin to only one of the surfaces coated with the phenolic adhesive. What is required is to provide a layer of polyvinyl acetal resin between two layers of phenolic adhesive each of which, in turn, is in contact with one of the surfaces to be joined. This arrangement exists at least at the time when pressure and heat are applied. During the bonding operation, commingling of the phenolic adhesive and the polyvinyl acetal may occur to some extent, but it is desirable to maintain, insofar as possible, the three layers so that the two phenolic layers are in contact, respectively, with the surfaces to be joined.

The process herein disclosed is ideally suited for the bonding or joining of metals. It can be employed for bonding pieces of the same or different metals together. It is also suitable for joining metals to other materials, such as wood, composition board, fiber board, and the like. It is a particularly suitable method for bonding materials of different coefficients of expansion because the joint is sufficiently strong to resist the stresses set up by expansion differentials.

In order to illustrate this invention, reference is made to the accompanying drawing. It presents a cross-sectional view of an assembly prepared for final bonding. The assembly consists of the parts to be joined, 1 and 4, coated respectively on the surfaces to be joined with a tacky layer of a phenolic condensate, 2 and 2', and an interposed layer of a powdered vinyl acetal resin, 3. According to the process of this invention such as assembly is subjected to heat and pressure until the layers of phenolic condensate, 2 and 2', are converted to the insoluble and infusible form.

While this process is suited for the bonding of strips of thin metal foil together and to other bases such as paper and cloth, its primary value lies in the joining of metal and the like in thicknesses greater than foil. Many adhesives—particularly thermoplastic materials—can be used to join foil satisfactorily. But the same adhesives are unsatisfactory for the bonding of pieces of metal in greater-than-foil thickness where the weight of the thicker metal and the rigidity thereof together with differential expansion rates impose stresses not ordinarily present in metal-foil assemblies.

The product produced in accordance herewith is not a conventional laminated structure in which the individual layers of phenolic resin and polyvinyl acetal constitute a considerable part of the total thickness and/or have such thickness as to be readily and individually discernible at the edge of the assembly. Instead, the product is a union of two materials by means of a thin layer of adhesive, the latter consisting of partially commingled layers of the phenolic and polyvinyl acetal resins.

The following examples will serve to illustrate this invention.

*Example 1*

*Preparation of phenolic adhesive.*—Five mols (470 grams) of phenol, 608 grams of a 37% aqueous formaldehyde solution (equivalent to 7.5 mols of formaldehyde), and .5 mol (28 grams) of potassium hydroxide were heated in a three-necked flask equipped with thermometer, stirrer, and reflux condenser at a temperature of approximately 85° C. until the solution of the condensate had become syrupy and had a viscosity of at least A on the Gardner-Holdt viscosity scale. The solids content was adjusted to 50% with water.

*Example 2*

*Bonding of metal to metal.*—Two strips of 24 ST Alclad, 0.064" thick and six inches square, were coated at one end of each with a brushed coat of the product of Example 1. The coating was one-half inch in width and extended across the entire end of each strip. Within five minutes, powdered polyvinyl acetal resin (available commercially as "Formvar") was sprinkled on the surface of the phenolic resin. The two strips of metal were tapped lightly to remove the excess powder. The two coated portions were then pressed together between the heated platens of a hydraulic press at a pressure of about 150 pounds per square inch and held at a temperature of 300° F. for a period of ten minutes. In this way, the strips were bonded together over an area six inches long by one-half inch wide. After removal from the press, the pieces of joined metal were cut at right angles to the glue line into smaller strips one inch wide. These served as test strips and each had a joined area of one-half inch square. These were clamped vertically in a Tinius Olson Tensile Tester and tested for tensile shear strength.

The average of the individual values was 4200 pounds per square inch when tested at 77° F.

Other strips similarly prepared were tested for tensile shear strength at 160° F., and the values were found to be at least 70% of the values obtained at 77° F.

Strips prepared in the same manner were immersed in boiling water for thirty minutes. On being cooled to 77° F., the strips were found to have a tensile shear value over 4000 pounds per square inch.

*Example 3*

*Bonding of metal to wood.*—The phenolic adhesive of Example 1 was spread on the surface of a sheet, 2" x 4", of ST Alclad, 0.04" in thickness, and also on the surface of a block of maple, 2" x 4" x 2". While the phenolic resin on the metal was still tacky, it was coated with powdered polyvinyl formal. The coated surfaces of the metal and wood were then pressed together in a heated hydraulic press at a pressure of 250 pounds per square inch and at a temperature of 275° F. for twenty minutes. On removal from the press, the cooled assembly was found to be well bonded, and all attempts to separate the metal and wood resulted in fracture of the wood. It is evident from this that the bond between the wood and the metal is stronger than the wood itself.

Similar metal-to-wood assemblies were tested (a) by immersion for thirty minutes in boiling water, and (b) by alternate soaking for eight hours in water at room temperature and drying for sixteen hours at 150° F., and in both tests the bonds were found to be stable and durable and to resist separation. The latter test is especially severe due to the stress set up by the expansion and contraction of the metal and wood on being heated and cooled.

While the above examples illustrate the bonding of aluminum, it is to be understood that the process also applies to the bonding of other metals, such as steel, iron, stainless steel, zinc, magnesium, and lead, and of alloys such as Monel and Dow metal. Similarly, glass may be bonded to metal; and wood may be bonded to wood and to other pervious materials such as cork and vulcanized fiber by this process. However, the process is particularly suitable for bonding metal to metal and metal to wood. Wood and metal may also be joined to such materials as vitreous enamels. For instance, definitely superior wooden-backed panels of steel surfaced with vitreous enamel may be made by this process. The wood is bonded directly to the vitreous surface, and the product may be much more widely used than the vitreous panel without the wooden backing. The wooden backing offers a ready means of fastening the panel to supports, for example, in the construction of storefronts, gasoline stations, and the like, and the backing furthermore overcomes the vibration or "oil-canning" of vitreous coated panels which do not have wooden backing.

I claim:

1. A process for uniting two surfaces which comprises coating the surfaces with an aqueous solution of a heat-reactive phenol-aldehyde condensate, applying to at least one of said coated surfaces, while said phenolic condensate is still tacky, a layer of a polyvinyl acetal resin in comminuted form, bringing the coated surfaces together to form an assembly, and heating and simultaneously pressing said assembly at a temperature above 200° F. until said phenolic condensate is converted to the infusible stage.

2. A process for bringing about adhesion between metals which comprises coating the metal surfaces to be joined with an aqueous solution of a heat-reactive phenol-aldehyde condensate, applying to at least one of said coated surfaces, while said phenolic condensate is still tacky, a layer of a polyvinyl acetal resin in comminuted form, bringing the coated surfaces together to form an assembly, and heating and simultaneously pressing said assembly at a temperature above 200° F. until said phenolic condensate is converted to the infusible stage.

3. A process for bringing about adhesion between metal and wood which comprises coating the metal and wood surfaces to be joined with an aqueous solution of a heat-reactive phenol-aldehyde condensate, applying to at least one of said coated surfaces, while said phenolic condensate is still tacky, a layer of a polyvinyl acetal resin in comminuted form, bringing the coated surfaces together to form an assembly, and heating and simultaneously pressing said assembly at a temperature above 200° F. until said phenolic condensate is converted to the infusible stage.

4. A process for uniting two surfaces which comprises coating the surfaces with an aqueous solution of a heat-reactive phenol-aldehyde condensate, applying to at least one of said coated surfaces, while said phenolic condensate is still tacky, a layer of a polyvinyl formal resin in comminuted form, bringing the coated surfaces together to form an assembly, and heating and simultaneously pressing said assembly at a temperature above 200° F. until said phenolic condensate is converted to the infusible stage.

5. A process for bringing about adhesion between metals which comprises coating the metal surfaces to be joined with an aqueous solution of a heat-reactive phenol-aldehyde condensate, applying to at least one of said coated surfaces, while said phenolic condensate is still tacky, a layer of a polyvinyl formal resin in comminuted form, bringing the coated surfaces together to form an assembly, and heating and simultaneously pressing said assembly at a temperature above 200° F. until said phenolic condensate is converted to the infusible stage.

6. A process for bringing about adhesion between metal and wood which comprises coating the metal and wood surfaces to be joined with an aqueous solution of a heat-reactive phenol-aldehyde condensate, applying to at least one of said coated surfaces, while said phenolic condensate is still tacky, a layer of a polyvinyl formal resin in comminuted form, bringing the coated surfaces together to form an assembly, and heating and simultaneously pressing said assembly at a temperature above 200° F. until said phenolic condensate is converted to the infusible stage.

7. A process for uniting two surfaces which comprises coating the surfaces with an aqueous solution of a heat-reactive phenol-aldehyde condensate, applying to at least one of said coated surfaces, while said phenolic condensate is still tacky, a layer of a polyvinyl acetal resin in comminuted form, bringing the coated surfaces together to form an assembly, and heating and simultaneously pressing said assembly at a temperature between about 240° and 350° F. until said phenolic condensate is converted to the infusible stage.

8. A process for bringing about adhesion between metals which comprises coating the metal surfaces to be joined with an aqueous solution of a heat-reactive phenol-aldehyde condensate, applying to at least one of said coated surfaces, while said phenolic condensate is still tacky, a layer of a polyvinyl acetal resin in comminuted form, bringing the coated surfaces together to form an assembly, and heating and simultaneously pressing said assembly at a temperature between about 240° and 350° F. until said phenolic condensate is converted to the infusible stage.

9. A process for bringing about adhesion between metal and wood which comprises coating the metal and wood surfaces to be joined with a solution of an aqueous heat-reactive phenol-aldehyde condensate, applying to at least one of said coated surfaces, while said phenolic condensate is still tacky, a layer of a polyvinyl acetal resin in comminuted form, bringing the coated surfaces together to form an assembly, and heating and simultaneously pressing said assembly at a temperature between about 240° and 350° F. until said phenolic condensate is converted to the infusible stage.

10. A process for bonding pieces of aluminum together which comprises coating the surfaces to be joined with an aqueous solution of a heat-reactive phenol-aldehyde condensate, applying to at least one of said coated surfaces, while said phenolic condensate is still tacky, a layer of a polyvinyl acetal resin in comminuted form, bringing the coated surfaces together to form an assembly, and heating and simultaneously pressing said assembly at a temperature above 200° F. until said phenolic condensate is converted to the infusible stage.

11. A process for bonding pieces of aluminum together which comprises coating the surfaces to be joined with an aqueous solution of a heat-reactive phenol-aldehyde condensate, applying to at least one of said coated surfaces, while said phenolic condensate is still tacky, a layer of a polyvinyl formal resin in comminuted form, bringing the coated surfaces together to form an assembly, and heating and simultaneously pressing said assembly at a temperature between about 240° and 350° F. until said phenolic condensate is converted to the infusible stage.

12. A process for bonding a vitreous enameled surface to wood which comprises coating the surfaces to be joined with an aqueous solution of a heat-reactive phenol-aldehyde condensate, applying to at least one of said coated surfaces, while said phenolic condensate is still tacky, a layer of a polyvinyl acetal resin in comminuted form, bringing the coated surfaces together to form an assembly, and heating and simultaneously pressing said assembly at a temperature between about 240° and 350° F. until said phenolic condensate is converted to the infusible stage.

NORMAN ADRIAN de BRUYNE.

REFERENCES CITED

The following references are of record in the file of this patent:

UNITED STATES PATENTS

| Number | Name | Date |
|---|---|---|
| 1,815,444 | Moss | July 21, 1931 |
| 1,867,575 | Loetscher | July 19, 1932 |
| 1,978,807 | Merritt | Oct. 30, 1934 |
| 2,261,983 | Ford | Nov. 11, 1941 |
| 2,397,231 | Barnes | Mar. 26, 1946 |
| 2,403,077 | Hershberger | July 2, 1946 |